(12) United States Patent
Allen

(10) Patent No.: US 6,741,279 B1
(45) Date of Patent: May 25, 2004

(54) SYSTEM AND METHOD FOR CAPTURING DOCUMENT ORIENTATION INFORMATION WITH A DIGITAL CAMERA

(75) Inventor: Ross R. Allen, Belmont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/120,096

(22) Filed: Jul. 21, 1998

(51) Int. Cl.[7] ............................................. H04N 5/262
(52) U.S. Cl. ................ 348/239; 348/207.99; 348/222.1
(58) Field of Search ................................ 348/207, 239, 348/222, 370, 371, 372, 61, 141, 143, 135, 169, 187, 220.1; 382/201, 209, 288, 294, 151, 291, 296, 152, 154, 106, 107, 108, 109; 250/566, 205.1; 396/106; 428/333; 235/462.45; H04N 5/225

(56) References Cited

U.S. PATENT DOCUMENTS

| | | | |
|---|---|---|---|
| 4,111,557 A | | 9/1978 | Rottenkolber et al. |
| 4,776,027 A | * | 10/1988 | Hisano et al. ............... 382/288 |
| 4,914,460 A | | 4/1990 | Caimi et al. |
| 4,969,037 A | * | 11/1990 | Poleschinski et al. ....... 348/370 |
| 5,753,931 A | | 5/1998 | Borchers et al. |
| 5,793,901 A | * | 8/1998 | Matsutake et al. ........... 382/294 |
| 5,900,909 A | * | 5/1999 | Parulski et al. .............. 348/232 |
| 6,003,773 A | * | 12/1999 | Durbin et al. ......... 235/462.45 |
| 6,026,186 A | * | 2/2000 | Fan ............................. 382/201 |
| 6,034,379 A | * | 3/2000 | Bunte et al. ................. 250/566 |
| 6,133,951 A | * | 10/2000 | Miyadera .................. 348/220.1 |
| 6,449,004 B1 | * | 9/2002 | Okisu et al. ................... 348/44 |
| 6,516,151 B2 | * | 2/2003 | Pilu ............................ 396/106 |

OTHER PUBLICATIONS

European Search Report and Annex dated Nov. 12, 1999, Application No. EP 99 30 4721.

* cited by examiner

Primary Examiner—Tuan Ho (57) ABSTRACT

The present invention provides a digital camera capturing technique for documents. In one embodiment, a method for a digital camera capturing technique includes determining an orientation of an object (e.g., a document) relative to an optical axis of the digital camera, and determining a distance of the object from the digital camera. The method also includes determining a planarity of the object (e.g., a curl of the document). The method further includes projecting a pattern on the object, and detecting the projected pattern, which is then processed to determine the orientation of the object relative to the optical axis of the digital camera, the distance of the object from the digital camera, and the planarity of the object.

39 Claims, 7 Drawing Sheets

SYSTEM AND METHOD FOR CAPTURING DOCUMENT ORIENTATION INFORMATION WITH A DIGITAL CAMERA

FIELD OF THE INVENTION

The present invention relates generally to digital cameras, and more particularly, to a digital camera capturing technique for documents.

BACKGROUND

Projecting one or more points onto an object and detecting the projected points using an autofocus detector is the basis of so-called active (but nonacoustic) autofocus mechanisms in typical point-and-shoot cameras. Cameras can reliably determine the focal distance to a small area on an object, but cannot determine if an object is imaged obliquely, as can be the case with handheld exposures of documents. Cameras can indicate to the user that an object is too close to focus upon, but do not indicate that the depth of focus is inadequate to image an entire object. Determining the adequacy of the depth of focus of an entire object represents a complex problem that is typically left to the user. However, manual procedures, such as stopped-down viewfinder techniques used by skilled photographers, are very inconvenient and prone to error particularly in low-contrast situations in a stopped-down viewfinder.

SUMMARY

In one embodiment, the present invention is incorporated into a digital camera to permit compensation to be performed for the following effects in the handheld capture of documents at close range:

- the optical axis of the camera is not aligned with a normal to the surface of the document;
- the depth-of-field for optics used for capture within 0.5–1 meter from the focal plane of the image sensor is limited, so proper focus is critical; and
- typical documents may not be planar, for example, pages bound in a book.

This embodiment extends the concept of auto-focus for cameras to auto-focus and auto-orientation, and provides an indication of the orientation of the optical axis with respect to the normal to the plane of the document and an indication of the degree of planarity of the document (e.g., including page curl of the document).

A typical active autofocus camera employs an infrared emitter and a photodetector arranged on either side of the optical axis. As the shutter release is pressed part-way, a highly-collimated IR beam is projected (usually as a vertical bar) on the subject, and the position of the beam is imaged on the detector. The measurement of range relies on parallax between the emitter and detector.

In one embodiment, the present invention involves projecting beams of visible or, preferably, infrared (IR) light on the document to be captured in a predetermined pattern (e.g., a spot pattern) as the shutter release is pressed part-way. The projected pattern is designed to provide information of range, orientation, and planarity of the document. The pattern is received by the image sensor in the digital camera and stored (or processed) immediately before the capture of the subject image using the image sensor. Using IR illumination provides an invisible measurement and uses the sensitivity of, for example, commercially available CCD and CMOS sensors to IR wavelengths. High intensity IR-LEDs are commercially available for use as emitters.

A pattern to provide range and alignment can be provided by projecting three beams of light in a pattern. More robust patterns for measuring planarity of the subject can employ more than three beams of light, for example, to provide a grid of multiple cells.

In one embodiment, a method for a digital camera capturing technique includes determining an orientation of an object (e.g., a document) relative to an optical axis of the digital camera, and determining a distance of the object from the digital camera. The method also includes determining a planarity of the object. The method further includes projecting a pattern on the object, and detecting the projected pattern, which is then processed to determine the orientation of the object relative to the optical axis of the digital camera, the distance of the object from the digital camera, and the planarity of the object.

Other aspects and advantages of the present invention will become apparent from the following detailed description and accompanying drawings.

DETAILED DESCRIPTION

There are many usability issues and technical limitations in handheld document imaging. Some of the current generation of digital cameras have a document capture mode, but the low pixel count in the image sensors of the current generation of digital cameras makes them useful only for small documents, such as, business cards. However, in the future, affordable digital cameras will likely have more than four million pixels, which will allow for full-page documents to be captured at a high level of document quality.

Accordingly, the present invention provides a digital camera capturing technique for documents. In one embodiment, the present invention uses projected beams of light (e.g., a spot pattern) and an image sensor of a digital camera to determine a distance, an orientation, and a planarity of an object to be captured. It is assumed that the spots are sharply imaged on the image sensor, which generally requires that the camera's autofocus system provide a useful, approximate focal distance measurement so that camera optics can be adjusted for optimal focus at close range. An object detected at close range automatically activates the document capture mode with its beam emissions and processing described herein. Measurement of the intensity distribution for each imaged spot provides an indication of the sharpness of focus and the usefulness of the spot for measurement purposes.

Figure 1A:
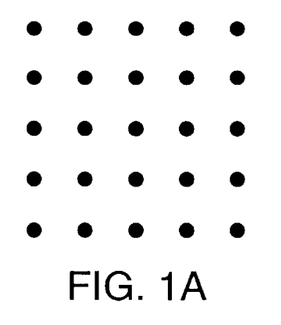
FIG. 1a shows a regular 5-by-5 array of spots of light (a spot pattern) projected on an object.

FIG. 1a shows a regular 5-by-5 array of spots of light projected on an object in accordance with one embodiment of the present invention. It is not necessary to have a regular array so long as the arrangement of the spots is taken into account when processing the acquired image of the spots on the object to be captured. FIGS. 1b–1e show examples of the spot pattern of FIG. 1a for various object orientations and positions in accordance with one embodiment of the present invention.

Figure 1B:
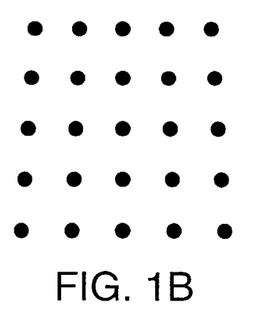
FIGS. 1b–1e show examples of the spot pattern for various object orientations and positions in accordance with one embodiment of the present invention.

FIG. 1b shows an example image of the spot pattern when the object is pitched and rolled with respect to the optical axis.

Figure 1C:
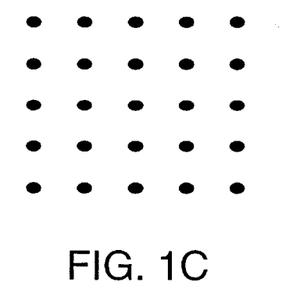

FIG. 1c shows an example image of the spot pattern when the object is pitched with respect to the optical axis.

Figure 1D:
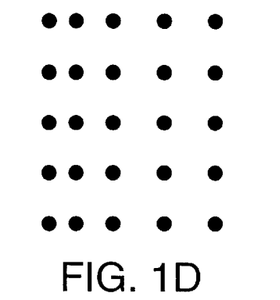

FIG. 1d shows an example image of the spot pattern where the optical and normal axes are coincident near the right-half of the object, but it is a book which is nonplanar, and the spots on the left indicate curvature of the object out of the plane, which is often referred to as page curl.

Figure 1E:
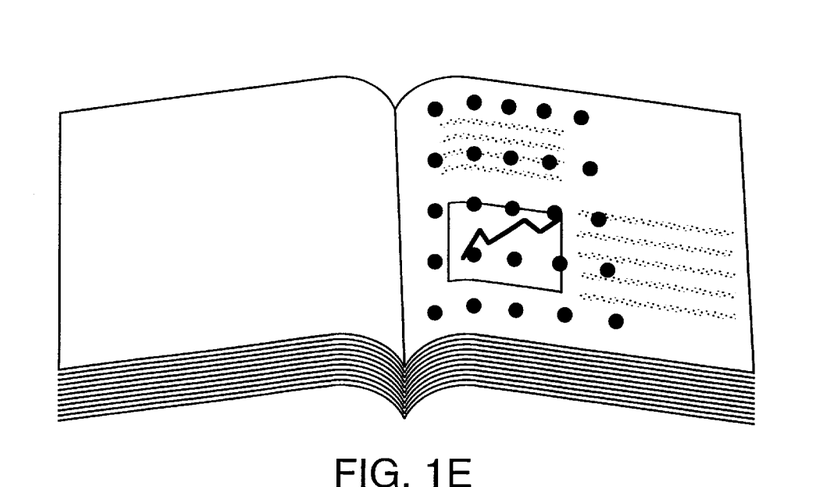
Figure 2A:
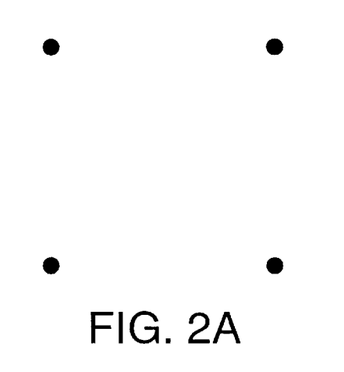
FIGS. 2a–2e are similar to FIGS. 1a–1e but with a spot pattern that includes only four spots in accordance with another embodiment of the present invention.
Figure 2B:
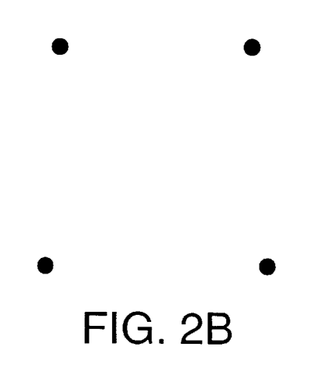
Figure 2C:
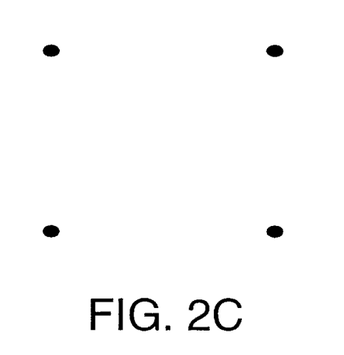
Figure 2D:
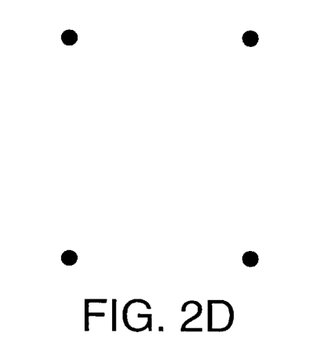
Figure 2E:
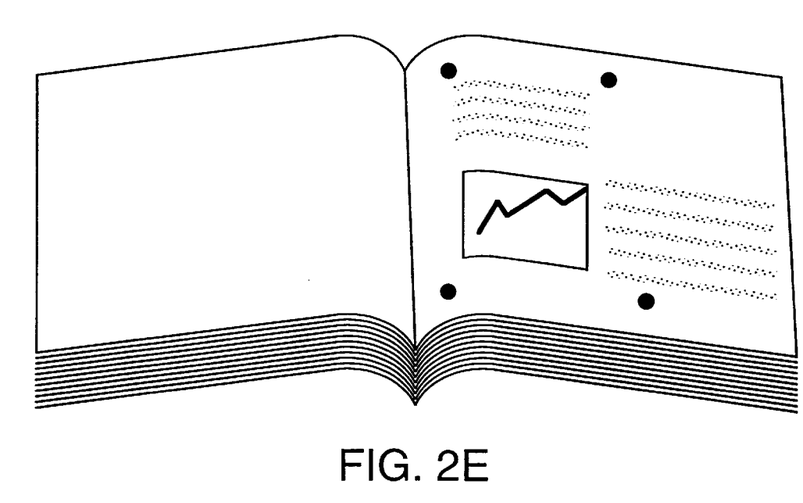

FIG. 1e is another example of the image of the spot pattern projected onto an open, bound book where there is pitch of the surface as well as curvature.

FIGS. 2a–2e are similar to FIGS. 1a–1e but with a spot pattern that includes only four spots in accordance with another embodiment of the present invention.

Figure 3A:
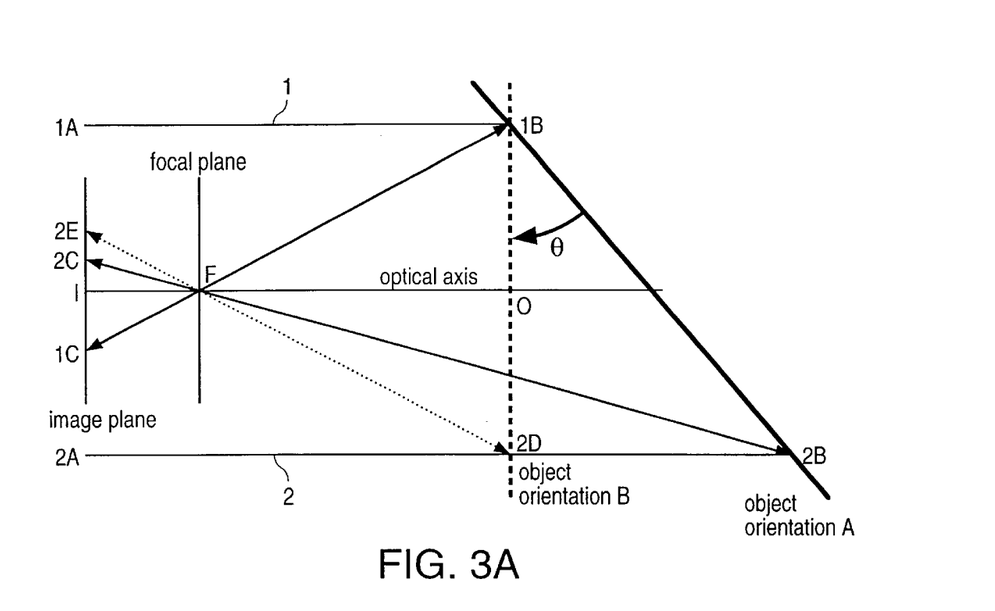
FIGS. 3a and 3b present an imaging approach for detecting distance and orientation of the object to be captured in accordance with one embodiment of the present invention.
Figure 3B:
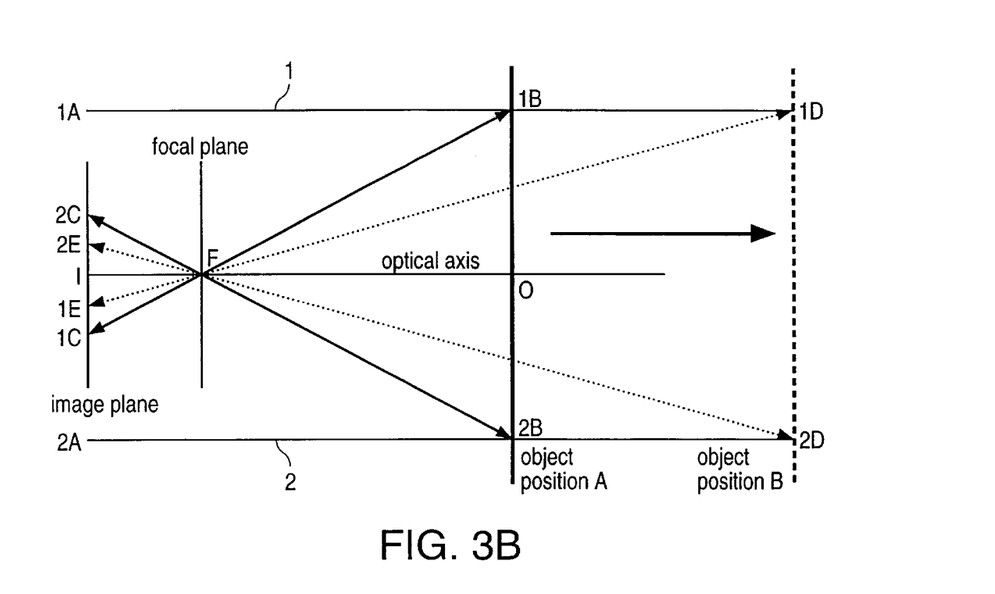

FIGS. 3a and 3b present an imaging approach for detecting distance and orientation of the object to be captured in accordance with one embodiment of the present invention. We assume the following for the sake of illustration of the general principle:

The object is a predominantly planar surface whose normal vector has an arbitrary angular rotation with respect to the camera's optical axis.

The rotation of the plane is about a vector perpendicular to the plane of emitters 1A and 2A in FIGS. 3a and 3b.

Figure 4:
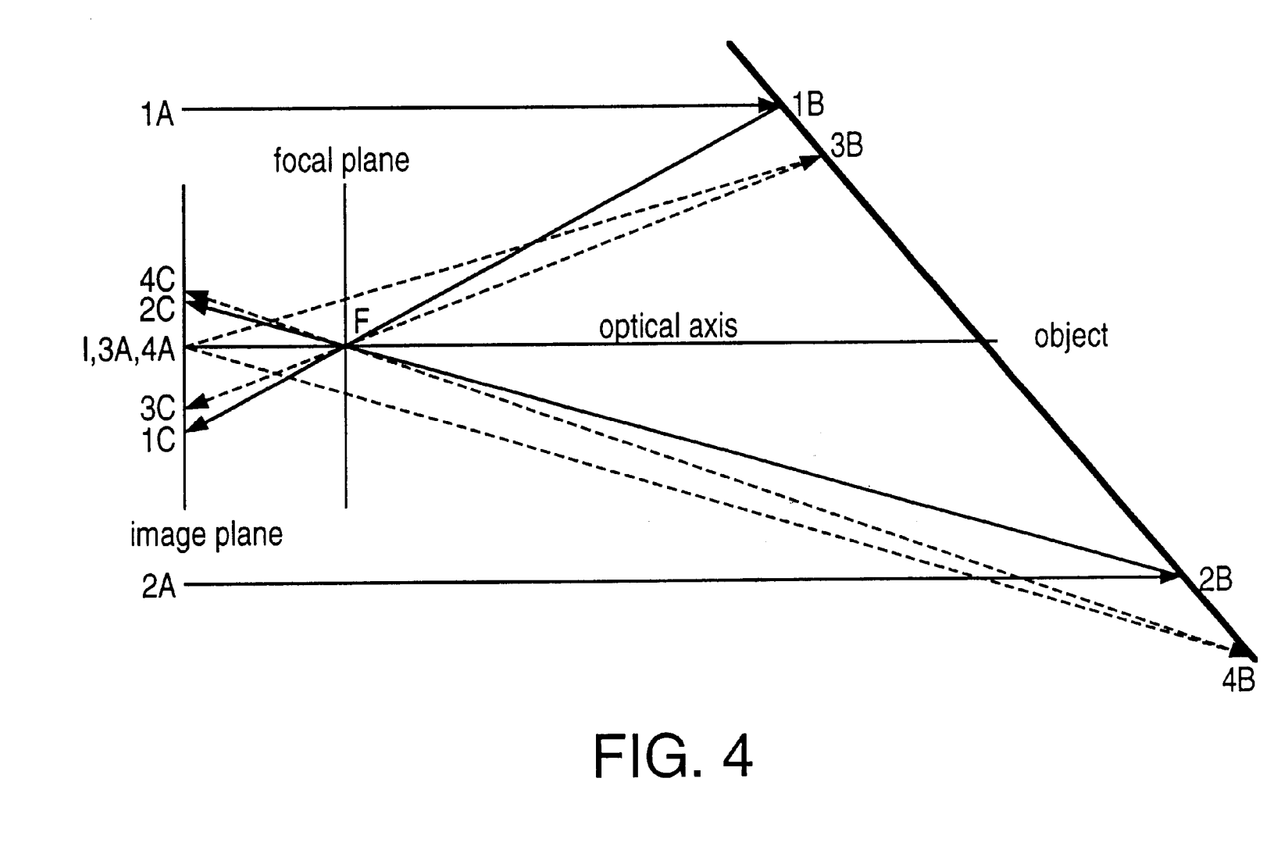
FIG. 4 presents an imaging approach for detecting distance and orientation of the object to be captured in accordance with another embodiment of the present invention.

Beams 1 and 2 are parallel to the optical axis and thereby form a plane containing all the points indicated in FIGS. 3a and 3b. This parallelism is not a requirement for this technique to work (e.g., FIG. 4 illustrates the use of diverging beams).

In a general case, the rotation of the plane is about an axis that is not perpendicular to the plane formed by beams 1 and 2. Some curvature of the object surface is allowed, for example, pages in a bound book and documents printed upon or wrapped around a cylinder.

In FIG. 3a, emitters 1A and 2A project beams 1 and 2 parallel to the optical axis. Object orientation A shows a plane rotated with respect to the optical axis (e.g., an oblique parallel projection). Beams 1 and 2 produce spots 1B and 2B, respectively. The images of spots 1B and 2B projected by the camera's lens onto its image sensor are 1C and 2C, respectively.

The orientation and distance of the plane can be determined from the distances I-1C (the distance between two points A and B is denoted as A–B) and I-2C. These distances can be measured in pixels on the image sensor in the camera's image plane. The inequality of I-1C and I-2C indicates that the plane is pitched with respect to the optical axis.

When the plane is rotated to align its normal with the optical axis, beams 1 and 2 produce spots 1B and 2D, respectively, for example, in object orientation B, which are imaged as points 1C and 2E, respectively. In this case, I-1C and I-2E are identical, indicating alignment of the normal vector and the optical axis.

FIG. 3b demonstrates distance measurement when the plane is perpendicular to the optical axis and translated between two positions (e.g., an orthographic parallel projection). In position A, beams 1 and 2 produce spots 1B and 2B on the object that are imaged as 1C and 2C, respectively. The distance to the object can be computed from I-1C and I-2C. Moving the object farther away, beams 1 and 2 produce spots 1D and 2D that are imaged as 1E and 2E, respectively. Because the distance I-1C is greater than I-1E, the object in position B is determined to be further away than the object in position A.

In this example, there is a single rotation of the object's normal with respect to the imaging axis, and beams 1 and 2 are parallel to the optical axis. The calculation of distance and orientation of the object represents an application of planar trigonometry using known, fixed distances in the projection and imaging system and the position of the imaged spots.

The distance between points 1A and 1B, 1A-1B, is computed as follows. It is assumed, in this example, that emitters 1A and 1B are located in the image plane (which introduces a constant in the calculation that can be omitted for clarity). By similar triangles, we know that $$1A\text{-}1B/I\text{-}F = 1A\text{-}1C/I\text{-}1C. \tag{1}$$

Solving for the only unknown, $$1A\text{-}1B = 1A\text{-}1C*(I\text{-}F/I\text{-}1C) \tag{2a}$$

and using the relation between fixed distances 1A-1C=I-1A+I-1C, $$1A\text{-}1B = I\text{-}F*(I\text{-}1A/I\text{-}1C). \tag{2b}$$

Similarly, it can be shown that $$2A\text{-}2B = I\text{-}F*(I\text{-}2A/I\text{-}2C) \tag{3}$$

An optimal focal distance for document capture can be computed from IA-1B and 2A-2B taking into account the depth of field for the lens at its working aperture.

The situation of a rotated object places demands on the camera's ability to deliver sharp focus across the document: for example, portions of the document may lie outside the camera's depth-of-focus. In this case, information obtained by the present invention can be used to make multiple exposures, each at different working distances, in order to capture the document piece-wise in sharp focus. Alternatively, the information that the camera's depth-of-focus is exceeded could be used to generate a signal to inform the user to reorient the camera with respect to the document. This information, which typically cannot be determined from a single autofocus measurement at a point on a document, provides a valuable feature for opportunistic and casual capture of documents where precise alignment between the camera and the object cannot be or is not obtained.

The angle θ that the plane makes with the optical axis in object orientation A in FIG. 3a is $$\arcsin\left((2A\text{-}2B\text{-}1A\text{-}1B)/1A\text{-}2A\right). \tag{4}$$

The constructions in FIGS. 3a and 3b and equations (1)–(4) show that, for parallel beams, it is desirable to maximize the offsets of the emitters from the optical axis (i.e., I-1A, I-2A) to achieve the maximum pixel count for I-1C and I-2C. Achieving the maximum pixel count for I-1C and I-2C provides the greatest resolution in equations (2b), (3), and (4) given the discrete number of pixels.

In the general case, where the rotation of the object is along a vector that is not perpendicular to the plane of emitters 1 and 2, more complex geometric transforms than equations (1)–(4) are required and would be apparent to one of ordinary skill in the art.

Planarity (e.g., distortion) of an object to be captured is determined, for example, using a spot pattern that includes more than 4 spots and by applying the above discussed logic to such a spot pattern.

"Digital Image Warping", George Wolberg, IEEE Computer Society 1990, pp. 52–56, discusses the principle of a 4-dot matrix for perspective transformations, and is incorporated herein by reference in its entirety.

FIG. 4 shows another embodiment in which emitters 3A and 4A are placed together on the optical axis and project a pattern using non-parallel (diverging) beams aimed toward the object. The non-parallel beams produce spots 3B and 4B on a rotated object. The images of these points at the camera's focal plane sensor are 3C and 4C, respectively.

In particular, FIG. 4 illustrates the different results for parallel beams 1 and 2 and divergent beams 3 and 4. It is observed that the difference I-3C–I-4C is small for two significantly different distances 3A-3B and 4A-4B. This observation suggests that the co-located, diverging beam method has less sensitivity and greater susceptibility to discretization errors than the parallel beam method, where the difference I-1C–I-2C generally provides greater sensitivity.

Figure 5:
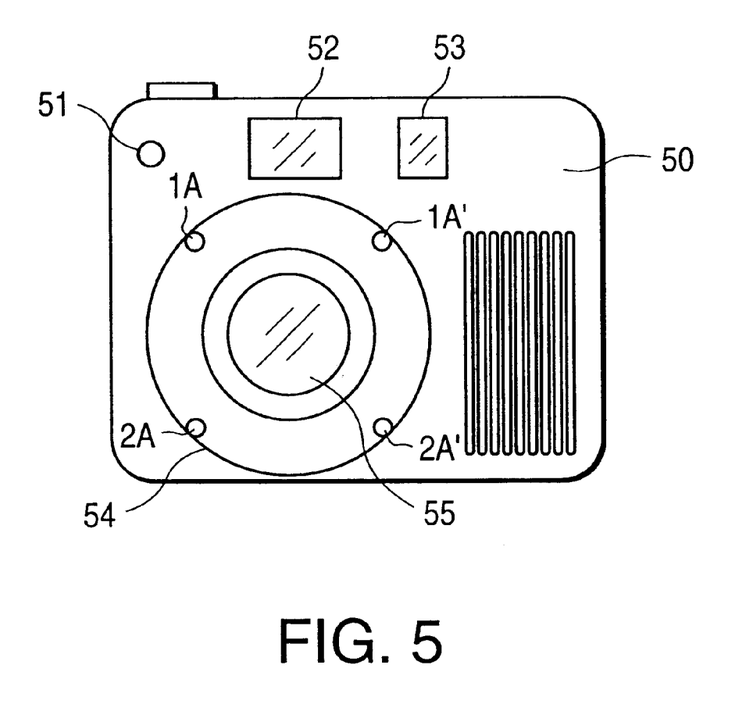
FIG. 5 shows a digital camera in accordance with one embodiment of the present invention.

FIG. 5 shows a digital camera 50 in accordance with one embodiment of the present invention. Digital camera 50 includes IR emitters 1A, 1A', 2A, and 2A' arranged around the optical axis of the camera's imaging system at a displacement that represents a reasonable compromise between usability and sensitivity. Digital camera 50 also includes an active autofocus emitter 51, a viewfinder 52, an autofocus detector 53, an orientation/range emitter 54, and an imaging lens 55.

Figure 6:
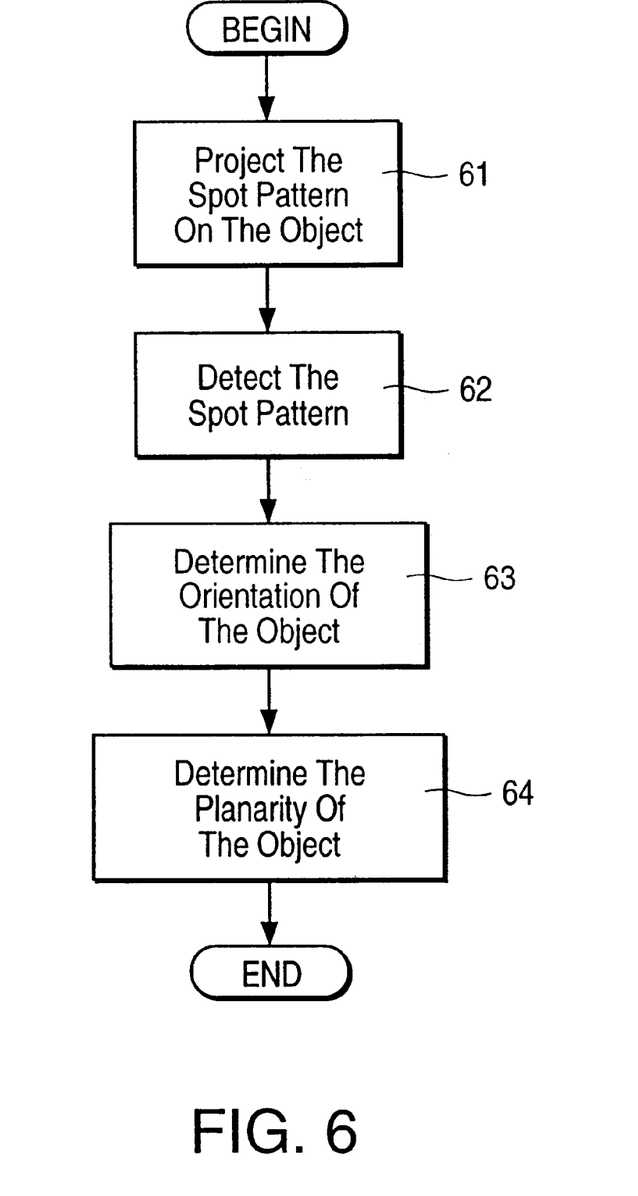
FIG. 6 is a flow diagram of the operation of the digital camera of FIG. 5 in accordance with one embodiment of the present invention.

FIG. 6 is a flow diagram of the operation of the digital camera of FIG. 5 in accordance with one embodiment of the present invention. As the shutter release of digital camera 50 is pressed, digital camera 50 projects a spot pattern using IR emitters 1A, 1A', 2A, and 2A' to emit parallel IR beams on the object at stage 61. Digital camera 50 detects the spot pattern on its image sensor (see FIG. 7) at stage 62. Digital camera 50 determines the orientation of the object at stage 63, as discussed above with respect to FIGS. 3a and 3b. Digital camera 50 determines the planarity of the object at stage 64, as discussed above with respect to FIGS. 3a and 3b. Digital camera 50 can also determine the distance of the object from digital camera 50, as discussed above. Further, digital camera 50 can determine a (page) curl of the object, for example, in which the object is a document such as a page in a bound book.

Digital camera 50 then processes this information accordingly, as discussed above with, respect to FIGS. 3A and 3B. Alternatively, digital camera 50 can emit non-parallel beams of light and perform stages 63 and 64 as discussed above with respect to FIG. 4. For example, output from orientation, planarity, and page curl determinations can be used by image processing algorithms to render a planar, undistorted image of a document captured obliquely and with page curl (e.g., a page of a bound book).

Figure 7:
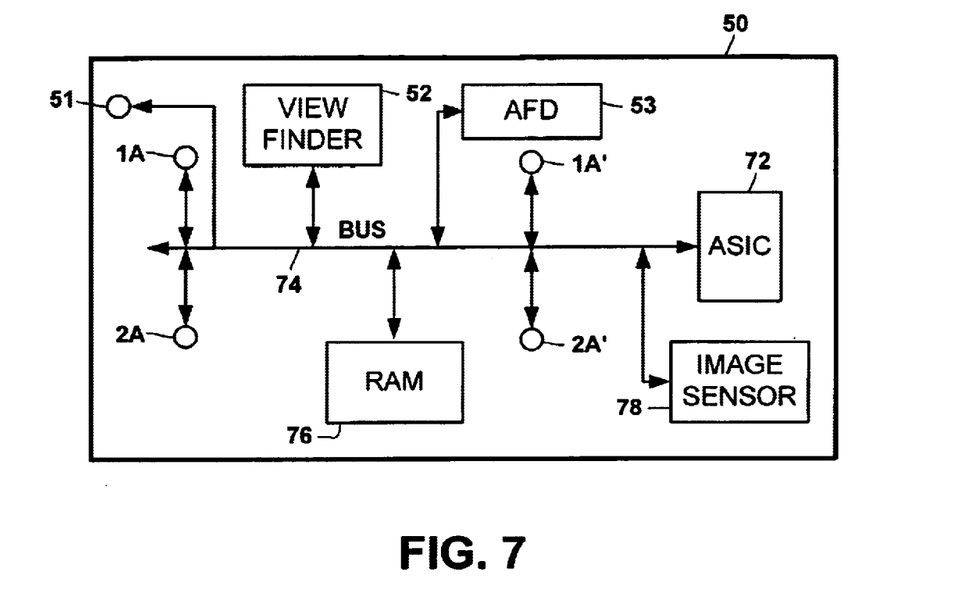
FIG. 7 is a block diagram of the digital camera of FIG. 5 shown in greater detail in accordance with one embodiment of the present invention.

FIG. 7 is a block diagram of the digital camera of FIG. 5 shown in greater detail in accordance with one embodiment of the present invention. In FIG. 7, digital camera 50 includes an ASIC 72 (Application Specific Integrated Circuit) that is in communication with orientation/range emitters 1A, 1A', 2A, and 2A', active autofocus emitter 51, viewfinder 52, autofocus detector 53, a memory 76 (e.g., a conventional random access memory that is used to store a captured digital image of a document) via a bus 74, and an image sensor 78 (e.g., a photodetector array that includes CMOS sensors for detecting IR light emitted from emitters 1A, 1A', 2A, and 2A'). For example, image sensor 78, which is used for image capture, is first used to acquire information relating to the distance, orientation, planarity, and curl of the document to be captured using the projected spot pattern (e.g., obtaining real-time information from a pre-exposure).

ASIC 72 represents a main ASIC of the digital camera. ASIC 72 performs image processing. For example, the image processing involved In the present invention can be implemented on image processing ASIC 72. For example, the logic for performing the digital camera capturing technique can be implemented in a hardware description language, such as the Verilog™ hardware description language, described, for example, In D. E. Thomas, J. P. Moorby, "The Verilog™ Hardware Description Language" (1991). Thus, the logic for performing the digital camera capturing technique can be implemented in the Verilog™ hardware description language, and the corresponding circuitry can be implemented using methods known in the art to provide an image processing ASIC for performing the digital camera capturing technique In accordance with one embodiment of the present invention (e.g., an ASIC implementation including logic that performs 3D geometrical transformations using a lookup table for inverse trigonometric calculations).

In one embodiment, the present invention includes the following:
providing physical measurements describing the distance, shape (e.g., planarity, such as curl of a document), orientation of an object (e.g., a document), and curl of the object to be captured with respect to the optical axis of a camera;
providing measurements of the distance, shape, orientation, and curl of a document to an image processor such that the document can be rendered as a planar object without geometric distortions;
provides an indication of the angular orientation of a camera's optical axis with respect to a normal to the surface of an object;
provides an indication of the planarity of an object;
operates in conjunction with the camera's active or passive range-finding system to detect a close-focus situation and enhance the capture of documents at close focal distances;
provides a signal to the camera's exposure architecture that multiple exposures at different focal distances are required to render the document given limitations on the camera's depth of focus in close-focus situations; and
provides an indication to the user that the camera must be reoriented with respect to the document to properly capture the document.

Although particular embodiments of the present invention have been shown and described, it will be obvious to those skilled in the art that changes and modifications can be made without departing from the present invention in its broader aspects. For example, the present invention can be implemented in hardware or software or a combination of hardware and software. The present invention can also be implemented using any number and arrangement of orientation/range emitters providing a variety of spot patterns for image processing. The image sensor circuit can be implemented using CMOS sensors, CCD sensors, or other types of sensors that can detect a projected spot pattern. Therefore, the appended claims are to encompass within their scope all such changes and modifications that fall within the true scope of the present invention.

What is claimed is:

1. A method for a digital camera capturing technique, the method comprising:
detecting an orientation of an object relative to an optical axis of the digital camera using light-emitting means for projecting a pattern on the object, and image sensor circuitry of the digital camera; and
capturing the object with the image sensor circuitry.

2. The method of claim 1 further comprising:
   detecting a planarity of the object with the image sensor circuitry.

3. A method for a digital camera capturing technique, the method comprising:
   detecting an orientation of an object relative to an optical axis of the digital camera using image sensor circuitry of the digital camera;
   capturing the object with the image sensor circuitry; and
   detecting a curl of the object with the image sensor circuitry, wherein the object comprises a document.

4. The method of claim 1 wherein the projected pattern is detected with the image sensor circuitry.

5. A method for a digital camera capturing technique, the method comprising:
   detecting an orientation of an object relative to an optical axis of the digital camera using image sensor circuitry of the digital camera;
   capturing the object with the image sensor circuitry;
   projecting a pattern on the object with emitter circuitry;
   detecting a projected pattern with the image sensor circuitry; and
   processing a detection of the projected pattern, with image processing circuitry, to determine the orientation of the object and the planarity of the object, wherein the object comprises a document.

6. The method of claim 4 wherein the projected pattern comprises at least four projected spots.

7. The method of claim 4 wherein the projecting a pattern comprises emitting multiple beams of light.

8. The method of claim 7 wherein the multiple beams of light comprise parallel beams of light.

9. The method of claim 7 wherein the multiple beams of light comprise infrared beams.

10. The method of claim 7 wherein the multiple beams of light comprise diverging beams of light.

11. The method of claim 7 further comprising:
    storing data that represents the orientation of the object and the planarity of the object.

12. An apparatus for a digital camera capturing technique, the apparatus comprising:
    an image sensor, the image sensor detecting a spot pattern projected on an object; and
    an image processor, the image processor in communication with the image sensor, the image processor determining an orientation of the object relative to an optical axis of the digital camera, wherein the image sensor captures the object.

13. The apparatus of claim 12 further comprising:
    the image processor determining a planarity of the object.

14. The apparatus of claim 13 further comprising:
    a plurality of emitters, the plurality of emitters projecting the spot pattern on the object.

15. The apparatus of claim 14 further comprising:
    the image sensor comprising a plurality of CMOS sensors.

16. An apparatus for a digital camera capturing technique, the apparatus comprising:
    an image sensor, the image sensor detecting a spot pattern projected on an object;
    an image processor, the image processor in communication with the image sensor, the image processor determining an orientation of the object relative to an optical axis of the digital camera, wherein the image sensor captures the object, and wherein the image processor determines a planarity of the object;
    a plurality of emitters, the plurality of emitters projecting the spot pattern on the object; and
    logic that processes the projected spot pattern to determine the planarity of the object, wherein the object comprises a document.

17. An apparatus for a digital camera capturing technique, the apparatus comprising:
    an image sensor, the image sensor detecting a spot pattern projected on an object;
    an image processor, the image processor in communication with the image sensor, the image processor determining an orientation of the object relative to an optical axis of the digital camera, wherein the image sensor captures the object, and wherein the image processor determines a planarity of the object;
    a plurality of emitters, the plurality of emitters projecting the spot pattern on the object; and
    logic that processes the projected spot pattern to determine the orientation of the object, wherein the object comprises a document.

18. The apparatus of claim 14 wherein the plurality of emitters emit multiple beams of light.

19. The apparatus of claim 18 wherein the multiple beams of light comprise parallel beams of light.

20. The apparatus of claim 18 wherein the multiple beams of light comprise infrared beams.

21. The apparatus of claim 18 wherein the multiple beams of light comprise diverging beams of light.

22. The apparatus of claim 18 further comprising:
    a memory, the memory storing data that represents the orientation of the object and the planarity of the object.

23. An apparatus for a digital camera capturing technique, the apparatus comprising:
    an image sensor, the image sensor detecting a spot pattern projected on an object;
    an image processor, the image processor in communication with the image sensor, the image processor determining an orientation of the object relative to an optical axis of the digital camera, wherein the image sensor captures the object, and wherein the image processor determines a planarity of the object;
    a plurality of emitters, the plurality of emitters projecting the spot pattern on the object, wherein the plurality of emitters emit multiple beams of light; and
    the image sensor detecting the multiple beams of light projected on the object, wherein the object comprises a document, whereby the image processor analyzes a detection of the multiple beams of light projected on the document to determine an orientation of the document, the planarity of the document, a curl of the document, and a distance of the document.

24. A method for a digital camera capturing technique for documents, the method comprising:
    projecting a spot pattern on a document to be captured by the digital camera;
    detecting the projected spot pattern;
    analyzing the projected spot pattern to determine an orientation of the document relative to an optical axis of the digital camera and a planarity of the document.

25. The method of claim 24 further comprising:
    (storing data that represents the orientation and the planarity of the document.

26. The method of claim 25 further comprising:
processing the data prior to capturing the document, whereby the image sensor captures the document in sharp focus and without geometric distortions.

27. The method of claim 24 further comprising:
processing multiple exposures of the document to capture portions of the document that are at multiple distances in sharp focus.

28. The method of claim 24 further comprising:
outputting a signal to indicate that the digital camera should be reoriented with respect to the document.

29. The method of claim 24 wherein the projected spot pattern comprises a projection of multiple beams of light.

30. The method of claim 29 wherein the multiple beams of light comprise parallel infrared beams.

31. The method of claim 24 further comprising:
analyzing the projected spot pattern to determine a distance of the document from the digital camera.

32. The method of claim 24 further comprising:
determining a curl of the document.

33. A method for a digital camera capturing technique the method comprising:
detecting an orientation of an object relative to an optical axis of the digital camera using image sensor circuitry of the digital camera and means for projecting a pattern on the object, wherein the detected orientation is relative to an axis normal to the plane of the object; and
capturing the object with the image sensor circuitry.

34. A digital camera for capturing an object, the digital camera comprising:
a light source for projecting a spot pattern on the object;
an image sensor for detecting the projected spot pattern; and
a processor, responsive to an output of the sensor, for determining an orientation of an object relative to an optical axis of the digital camera.

35. A digital camera for capturing an object, the digital camera comprising:
means for projecting a spot pattern on the object;
means for detecting the projected spot pattern; and
means for using the detected spot pattern to determine orientation of the object relative to an optical axis of the digital camera.

36. The digital camera of claim 34, wherein the processor further determines planarity of the object in response to the output of the sensor.

37. The digital camera of claim 34, wherein the processor also determines curl of the object in response to the output of the sensor.

38. The digital camera of claim 34, wherein the processor also determines a distance of the document from the digital camera in response to the output of the sensor.

39. The digital camera of claim 34, wherein the light source projects the spot pattern by projecting multiple beams of light.

* * * * *